United States Patent
Suzuki et al.

(10) Patent No.: US 10,308,172 B2
(45) Date of Patent: Jun. 4, 2019

(54) IMAGE DISPLAY DEVICE

(71) Applicant: SUBARU CORPORATION, Tokyo (JP)

(72) Inventors: Dan Suzuki, Tokyo (JP); Makoto Kinoshita, Tokyo (JP); Toru Yamazumi, Tokyo (JP); Kentarou Yamasaski, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/888,791

(22) Filed: Feb. 5, 2018

(65) Prior Publication Data

US 2018/0257547 A1    Sep. 13, 2018

(30) Foreign Application Priority Data

Mar. 10, 2017 (JP) .................. 2017-046050

(51) Int. Cl.
  *B60Q 1/04*  (2006.01)
  *B60Q 1/50*  (2006.01)
  *G08G 1/005* (2006.01)

(52) U.S. Cl.
  CPC ............. *B60Q 1/50* (2013.01); *B60Q 1/04* (2013.01); *G08G 1/005* (2013.01); *B60Q 2400/50* (2013.01)

(58) Field of Classification Search
  None
  See application file for complete search history.

(56) References Cited

U.S. PATENT DOCUMENTS

| | | |
|---|---|---|
| 5,654,705 A | 8/1997 | Houten et al. |
| 6,662,108 B2 | 12/2003 | Miller et al. |
| 8,269,652 B2 | 9/2012 | Seder et al. |
| 8,954,252 B1 | 2/2015 | Urmson et al. |
| 8,996,224 B1 | 3/2015 | Herbach et al. |
| 9,135,754 B2 | 9/2015 | Ng-Thow-Hing et al. |

(Continued)

FOREIGN PATENT DOCUMENTS

| | | |
|---|---|---|
| EP | 2233356 A1 | 9/2010 |
| JP | 11-263145 A | 9/1999 |

(Continued)

OTHER PUBLICATIONS

Japanese Office Action issued in corresponding Japanese Patent Application No. 2017-046050, dated Aug. 7, 2018, with English Translation.

(Continued)

*Primary Examiner* — Fekadeselassie Girma
(74) *Attorney, Agent, or Firm* — McDermott Will & Emery LLP

(57) ABSTRACT

An image display device includes an illuminator and a detector. The illuminator is configured to send out light on a road surface around a first vehicle as an own vehicle, to display a first notification image that notifies information to surroundings of the first vehicle. The detector is configured to detect an image displayed on the road surface or information indicated by the image. The illuminator is configured to display the first notification image on the basis of the image detected by the detector or the information indicated by the image.

16 Claims, 11 Drawing Sheets

(56) References Cited

U.S. PATENT DOCUMENTS

| | | |
|---|---|---|
| 9,475,422 B2 | 10/2016 | Hillis et al. |
| 9,558,409 B2 | 1/2017 | Pliefke et al. |
| 9,575,176 B2 | 2/2017 | Baba |
| 9,654,738 B1 | 5/2017 | Ferguson et al. |
| 9,849,784 B1 | 12/2017 | Chan et al. |
| 9,896,107 B1 | 2/2018 | Huang |
| 9,902,311 B2 | 2/2018 | Sweeney et al. |
| 9,905,132 B2 | 2/2018 | Habu |
| 9,925,989 B2 | 3/2018 | Lee |
| 9,947,221 B1 | 4/2018 | Mazzola |
| 9,952,054 B2 | 4/2018 | An et al. |
| 9,969,326 B2 | 5/2018 | Ross |
| 9,978,280 B2 | 5/2018 | Lee et al. |
| 9,988,047 B2 | 6/2018 | Johnson et al. |
| 10,048,688 B2 | 8/2018 | Ramasamy |
| 10,089,537 B2 | 10/2018 | Nix et al. |
| 2002/0140555 A1 | 10/2002 | Jette et al. |
| 2005/0278098 A1 | 12/2005 | Breed |
| 2006/0055525 A1 | 3/2006 | Kubota et al. |
| 2007/0067081 A1 | 3/2007 | Ton |
| 2008/0040004 A1 | 2/2008 | Breed |
| 2008/0175012 A1 | 7/2008 | Shimaoka et al. |
| 2008/0243389 A1 | 10/2008 | Inoue et al. |
| 2008/0312832 A1 | 12/2008 | Greene et al. |
| 2008/0312833 A1 | 12/2008 | Greene et al. |
| 2009/0160678 A1 | 6/2009 | Turnbull |
| 2010/0030474 A1 | 2/2010 | Sawada |
| 2010/0082251 A1 | 4/2010 | Kogure |
| 2011/0128139 A1 | 6/2011 | Tauchi et al. |
| 2011/0184617 A1 | 7/2011 | Hegemann et al. |
| 2012/0140988 A1 | 6/2012 | Takahashi |
| 2012/0194356 A1 | 8/2012 | Haines et al. |
| 2012/0224060 A1* | 9/2012 | Gurevich ............ B60R 1/00 348/148 |
| 2013/0057690 A1* | 3/2013 | Mitsugi ............ G08G 1/168 348/148 |
| 2014/0062685 A1 | 3/2014 | Tamatsu et al. |
| 2014/0152488 A1 | 6/2014 | Baba |
| 2015/0103174 A1 | 4/2015 | Emura et al. |
| 2015/0179073 A1 | 6/2015 | Suzuno |
| 2015/0194082 A1 | 7/2015 | McEwan |
| 2015/0334269 A1 | 11/2015 | Yokota et al. |
| 2016/0039286 A1 | 2/2016 | Shibata et al. |
| 2016/0093207 A1 | 3/2016 | Di Censo et al. |
| 2016/0115650 A1 | 4/2016 | Leung |
| 2016/0247393 A1* | 8/2016 | Okamoto ............ B60W 50/14 |
| 2016/0332568 A1* | 11/2016 | Kim ............ B60Q 1/50 |
| 2017/0043705 A1 | 2/2017 | Mizuno |
| 2017/0140651 A1 | 5/2017 | Lee et al. |
| 2017/0182934 A1 | 6/2017 | Arita et al. |
| 2017/0210283 A1* | 7/2017 | Ishida ............ B60Q 1/442 |
| 2017/0217361 A1 | 8/2017 | Miller |
| 2017/0217368 A1 | 8/2017 | Lewis et al. |
| 2017/0217422 A1 | 8/2017 | Nakamura |
| 2017/0240096 A1 | 8/2017 | Ross et al. |
| 2017/0253177 A1* | 9/2017 | Kawamata ............ B60Q 1/50 |
| 2017/0253181 A1 | 9/2017 | Choi et al. |
| 2017/0259734 A1* | 9/2017 | Imaishi ............ B60Q 1/444 |
| 2017/0276308 A1* | 9/2017 | Nakazawa ............ B60Q 1/1423 |
| 2017/0330463 A1 | 11/2017 | Li et al. |
| 2017/0337821 A1 | 11/2017 | Masuda et al. |
| 2017/0372613 A1 | 12/2017 | Habu |
| 2018/0009374 A1 | 1/2018 | Kim et al. |
| 2018/0024562 A1 | 1/2018 | Bellaiche |
| 2018/0025235 A1 | 1/2018 | Fridman |
| 2018/0033306 A1 | 2/2018 | Kim et al. |
| 2018/0086346 A1 | 3/2018 | Fujisawa et al. |
| 2018/0118099 A1* | 5/2018 | Kunii ............ B60Q 1/04 |
| 2018/0118106 A1* | 5/2018 | You ............ B60Q 5/008 |
| 2018/0134286 A1* | 5/2018 | Yi ............ B60W 10/04 |
| 2018/0141484 A1* | 5/2018 | Haneda ............ B60Q 1/26 |
| 2018/0173234 A1* | 6/2018 | Van Laack ............ G06K 9/00362 |
| 2018/0173237 A1* | 6/2018 | Reiley ............ G05D 1/0214 |
| 2018/0218601 A1 | 8/2018 | Aoki et al. |
| 2018/0247540 A1 | 8/2018 | Hagawa et al. |
| 2018/0250596 A1 | 9/2018 | Kim |
| 2018/0253609 A1* | 9/2018 | Potter ............ G06K 9/00791 |
| 2018/0257547 A1 | 9/2018 | Suzuki et al. |
| 2018/0257549 A1 | 9/2018 | Suzuki et al. |
| 2018/0257550 A1 | 9/2018 | Suzuki et al. |
| 2018/0261080 A1 | 9/2018 | Suzuki et al. |
| 2018/0261081 A1 | 9/2018 | Suzuki et al. |

FOREIGN PATENT DOCUMENTS

| | | |
|---|---|---|
| JP | 2006-252264 A | 9/2006 |
| JP | 2008-007079 A | 1/2008 |
| JP | 2008-143510 A | 6/2008 |
| JP | 2009-149152 A | 7/2009 |
| JP | 2009-230701 A | 10/2009 |
| JP | 4720650 B2 | 7/2011 |
| JP | 2013-203251 A | 10/2013 |
| JP | 2014-189198 A | 10/2014 |
| JP | 2015-205572 A | 11/2015 |
| JP | 2016-020876 A | 2/2016 |
| JP | 2016-107777 A | 6/2016 |
| JP | 2017-001501 A | 1/2017 |
| JP | 2017-007502 A | 1/2017 |
| JP | 2017-049885 A | 3/2017 |
| JP | 2017-159699 A | 9/2017 |
| WO | 2016/024316 A1 | 2/2016 |
| WO | 2016/039288 A1 | 3/2016 |
| WO | 2016/163294 A1 | 10/2016 |

OTHER PUBLICATIONS

Non-Final Office Action, dated Jan. 2, 2019, issued in related U.S. Appl. No. 15/890,918.

Japanese Decision to Grant a Patent, with English Translation, dated Oct. 2, 2018, issued in related Japanese Patent Application No. 2017-046045.

Japanese Office Action, with English Translation, dated Jul. 24, 2018, issued in related Japanese Patent Application No. 2017-046045.

Japanese Office Action, with English Translation, dated Jul. 24, 2018, issued in related Japanese Patent Application No. 2017-046047.

Japanese Office Action, with English Translation, dated Sep. 11, 2018, issued in related Japanese Patent Application No. 2017-046052.

Non-Final Office Action, dated Oct. 17, 2018, issued in related U.S. Appl. No. 15/877,859.

Non-Final Office Action, dated Jul. 11, 2018, issued in related U.S. Appl. No. 15/890,963.

Non-Final Office Action, dated Jun. 4, 2018, issued in related U.S. Appl. No. 15/877,901.

Final Office Action, dated Oct. 30, 2018, issued in related U.S. Appl. No. 15/877,901.

Japanese Office Action issued in corresponding Japanese Patent Application No. 2017-046049, dated Aug. 7, 2018, with English Translation.

Japanese Office Action issue in corresponding Japanese Patent Application No. 2017-046452, dated Aug. 21, 2018, with English Translation.

Non-Final Office Action issued in related U.S. Appl. No. 15/888,858, dated Jul. 24, 2018.

Notice of Allowance issued in related U.S. Appl. No. 15/890,963, dated Dec. 19, 2018.

Notice of Allowance issued in related U.S. Appl. No. 15/888,858, dated Feb. 8, 2019.

Notice of Allowance issued in related U.S. Appl. No. 15/877,901, dated Feb. 20, 2019.

* cited by examiner

| PRIORITY LEVEL | NOTIFICATION INFORMATION |
|---|---|
| | NOTIFICATION INFORMATION TO PEDESTRIAN |
| A | NO CROSSING |
| B | PERMISSION TO CROSS |
| | PROMPTING FOR CROSSING |
| C | GREETING |

FIG. 3

| PRIORITY LEVEL | NOTIFICATION INFORMATION |
|---|---|
| | NOTIFICATION INFORMATION TO VEHICLE |
| A | EMERGENCY STOP |
| B | WARNING: ACCIDENT |
| | WARNING: TRAFFIC JAM |
| C | GREETING |

FIG. 12

IMAGE DISPLAY DEVICE

CROSS-REFERENCE TO RELATED APPLICATIONS

The present application claims priority from Japanese Patent Application No. 2017-046050 filed on Mar. 10, 2017, the entire contents of which are hereby incorporated by reference.

BACKGROUND

The technology relates to an image display device that displays an image on a road surface.

A device has been known that depicts figures or other geometrical shapes on a road surface, by a light-distribution control of headlights or other lights of a vehicle.

For example, Japanese Unexamined Patent Application Publication (JP-A) No. 2016-107777 describes an optical device that includes an illuminator and a controller. The illuminator is mounted on a vehicle and sends out light. The controller controls, in accordance of information on surroundings of the vehicle, the illuminator to intermittently illuminate a target of illumination with illumination or display, or both, based on the information on the surroundings of the vehicle.

SUMMARY

Regarding an image display device that displays an image on a road surface, there is a request for ability to appropriately notify information to a target of notification.

It is desirable to provide an image display device that makes it possible to appropriately notify information to a target of notification.

An aspect of the technology provides an image display device including an illuminator and a detector. The illuminator is configured to send out light on a road surface around a first vehicle as an own vehicle, to display a first notification image that notifies information to surroundings of the first vehicle. The detector is configured to detect an image displayed on the road surface or information indicated by the image. The illuminator is configured to display the first notification image on the basis of the image detected by the detector or the information indicated by the image.

An aspect of the technology provides an image display device including an illuminator, a detector, and circuitry. The illuminator is configured to send out light on a road surface around a first vehicle as an own vehicle, to display a first notification image that notifies information to surroundings of the first vehicle. The detector is configured to detect an image displayed on the road surface or information indicated by the image. The circuitry is configured to control the illuminator to display the first notification image on the basis of the image detected by the detector or the information indicated by the image.

BRIEF DESCRIPTION OF THE DRAWINGS

Some implementations of the technology are described below as mere examples with reference to the accompanying drawings.

FIG. 3 summarizes priority levels of notification information to be evaluated in the image display device according to the first implementation of the technology.

FIG. 12 summarizes priority levels of notification information to be evaluated in an image display device according to a fourth implementation of the technology.

DETAILED DESCRIPTION

Figure 1:
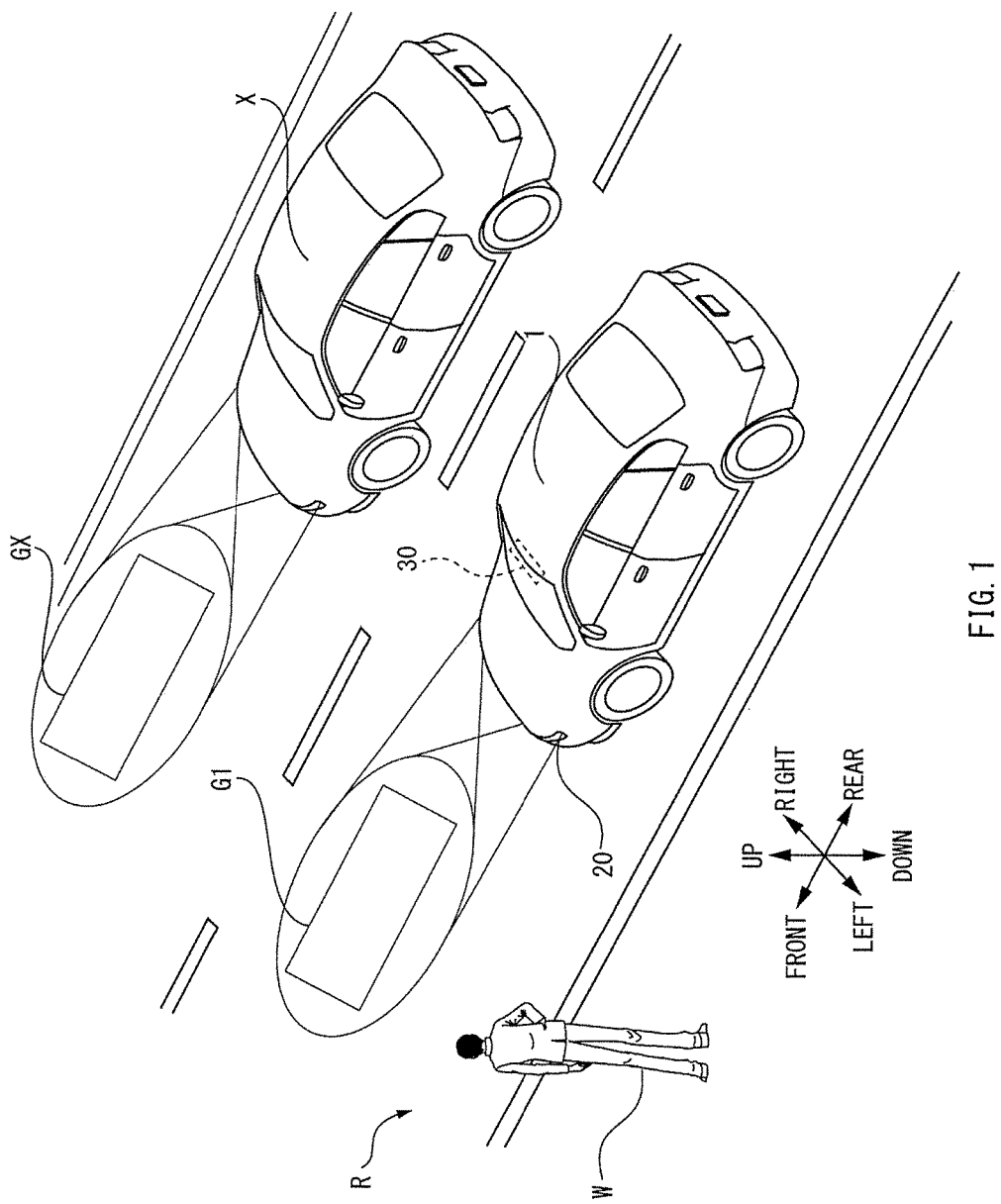
FIG. 1 illustrates an appearance and a configuration of an own vehicle including an image display device according to a first implementation of the technology.

In the following, some implementations of the technology are described in detail with reference to the drawings. The implementations described below each illustrate one example of the technology, and are not intended to limit the contents of the technology. All of the configurations and the operation described in each implementation are not necessarily essential for configurations and operation of the technology. It is to be noted that like constituent elements are denoted by the same reference characters, and description thereof is omitted to avoid redundancy.

[1. Configuration of Image Display Device]

Figure 2:
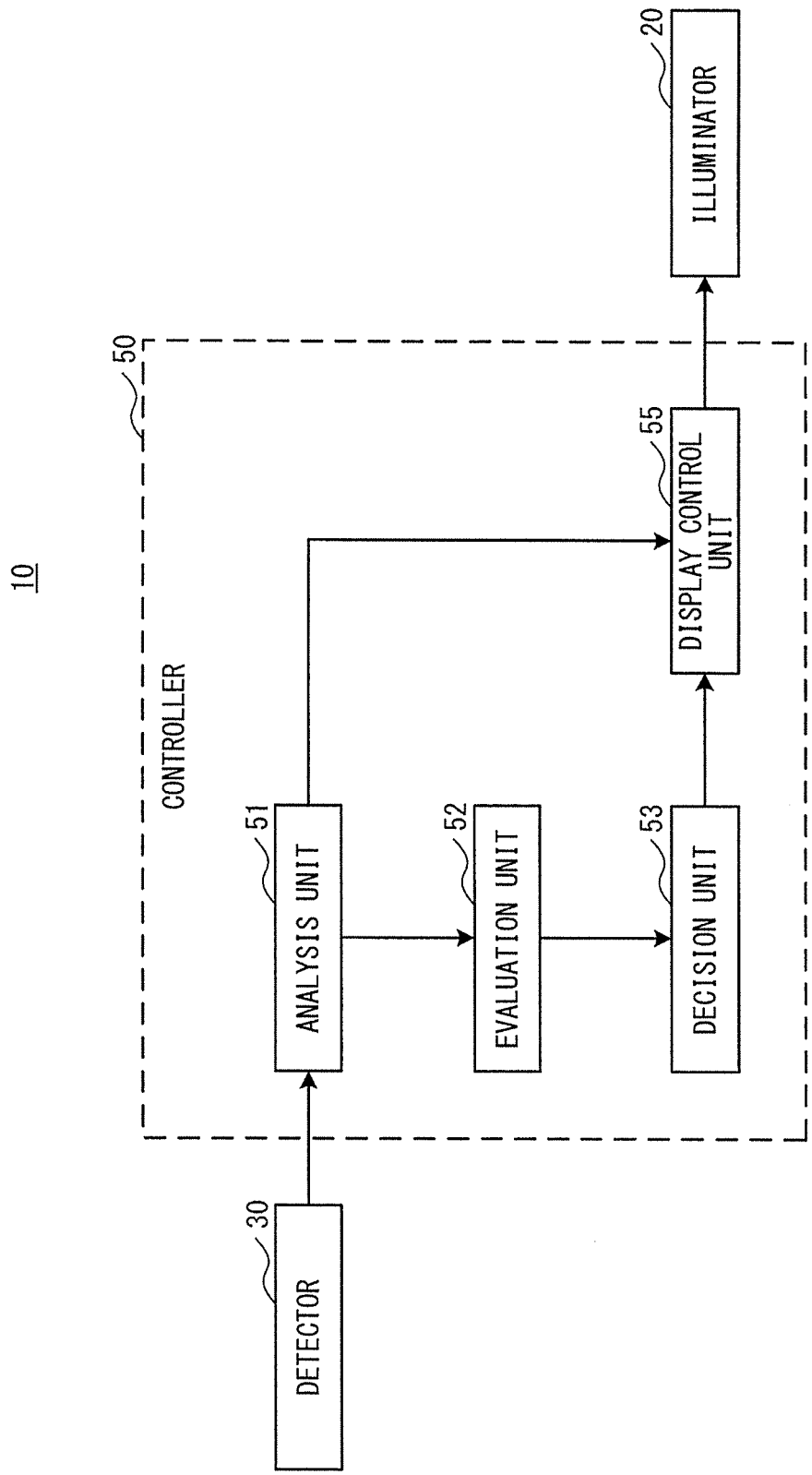
FIG. 2 is a block diagram of a functional configuration of the image display device according to the first implementation of the technology.

FIG. 1 illustrates an appearance and a configuration of an own vehicle 1 including an image display device 10 according to a first implementation of the technology. FIG. 2 is a block diagram of a functional configuration of the image display device 10 according to the first implementation of the technology. FIG. 3 is a table that summarizes priority levels of notification information to be evaluated in the image display device 10 according to the first implementation of the technology.

The image display device 10 may be a device that is mounted on the own vehicle 1, and displays an image on a road surface R around the own vehicle 1. The image display device 10 may be a device that displays the image on the road surface R, to notify information to a surrounding entity around the own vehicle 1. The term "surrounding entity" means a surrounding vehicle different from the own vehicle 1, and a pedestrian. The term "pedestrian" means a person who passes along a sidewalk, and a person who passes along or crosses a driveway, inclusive of a person who rides a bicycle.

The image to be displayed on the road surface R by the image display device 10 to notify the information to the surrounding entity around the own vehicle 1 is also called an "own-vehicle notification image". The information to be notified by the own-vehicle notification image to the surrounding entity around the own vehicle 1 is also called "own-vehicle notification information". An image to be displayed on the road surface R by an image display device of a surrounding vehicle X to notify information to a surrounding entity around the surrounding vehicle X is also called a "surrounding-vehicle notification image". The information to be notified by the surrounding-vehicle notification image to the surrounding entity around the surrounding vehicle X is also called "surrounding-vehicle notification information". The own-vehicle notification image and the surrounding-vehicle notification image are also generically called "notification images". The own-vehicle notification information and the surrounding-vehicle notification information are also generically called "notification information". Moreover, processing to be performed by the image display device 10 to display the own-vehicle notification image G1 on the road surface R is also called "image display processing".

As illustrated in FIGS. 1 and 2, the image display device 10 may be a device that displays the own-vehicle notification image G1 on the road surface R frontward of the own vehicle 1, to notify the information to a pedestrian W frontward of the own vehicle 1. The notification images G including the own-vehicle notification image G1 and the surrounding-vehicle notification image GX may each be a still image, a moving image, or a combination thereof. The notification images G may each be a three-dimensional image such as hologram. It is to be noted that the term "frontward of the own vehicle 1" means a direction of an advance of the own vehicle 1, as illustrated in FIG. 1.

The image display device 10 may include an illuminator 20, a detector 30, and a controller 50.

The illuminator 20 may be a device that sends out light on the road surface R frontward of the own vehicle 1. The image to be displayed on the road surface R by the image display device 10 may be depicted by the light sent out by the illuminator 20. In other words, the illuminator 20 may be able to send out the light on the road surface R frontward of the own vehicle 1, to display the image on the road surface R. The illuminator 20 may include various light sources such as a lamp, a light emitting diode (LED), a digital micro mirror device, and a projector. The illuminator 20 may include headlights of the own vehicle 1. In one preferred but non-limiting example, the illuminator 20 may include light-distribution-variable headlights such as adaptive driving beam (ADB).

The detector 30 may be a sensor that detects surroundings of the own vehicle 1. The detector 30 may include one or more cameras. The detector 30 may include a combination of a camera and, for example, radar. The term "surroundings of the own vehicle 1" means road environment of a road on which the own vehicle 1 is located. Non-limiting examples of the road environment to be detected by the detector 30 may include roads, pedestrians, vehicles, road markings, road signs, traffic lights, intersections, railway crossings, footbridges, street lamps, buildings, and equipment.

In particular, the detector 30 may be able to detect the pedestrian W frontward of the own vehicle 1. In one specific but non-limiting example, the detector 30 may detect, in real time, a pedestrian position and a pedestrian direction. The pedestrian position may indicate a position of the pedestrian W frontward of the own vehicle 1. The pedestrian direction may indicate a direction of the pedestrian W. The detector 30 may supply the controller 50 with information regarding the pedestrian position detected, and with information regarding the pedestrian direction detected. It is to be noted that the pedestrian direction means a direction of movement of the pedestrian W in a case where the pedestrian W is moving. In a case where the pedestrian W is standing still, the pedestrian direction means a direction to which the face of the pedestrian W is turned.

Moreover, the detector 30 may be able to detect, in real time, an image displayed on the road surface R, or information indicated by the image. Non-limiting examples of the image displayed on the road surface R may include the surrounding-vehicle notification image GX displayed on the road surface R by the surrounding vehicle X. In detecting the surrounding-vehicle notification image GX, the detector 30 may perform imaging of the surrounding-vehicle notification image GX displayed on the road surface R, to detect the surrounding-vehicle notification image GX. Alternatively, the detector 30 may have a function of communication, and receive information indicated by the surrounding-vehicle notification image GX displayed on the road surface R, to detect the information indicated by the surrounding-vehicle notification image GX. In this case, the detector 30 may perform inter-vehicle communication with the surrounding vehicle X that has displayed the surrounding-vehicle notification image GX, to receive the information indicated by the surrounding-vehicle notification image GX. Moreover, in this case, the detector 30 may perform communication with a third vehicle different from the surrounding vehicle X that has displayed the surrounding-vehicle notification image GX, or perform communication with communication equipment, to receive the information indicated by the surrounding-vehicle notification image GX. In any way, the detector 30 may be able to detect the surrounding-vehicle notification image GX displayed on the road surface R frontward of the own vehicle 1 or the information indicated by the surrounding-vehicle notification image GX. The detector 30 may be able to supply a detection result to the controller 50.

The controller 50 may be a control unit that controls image display on the road surface R by the image display device 10. The controller 50 may be a control unit that controls the illuminator 20 on the basis of the information supplied from the detector 30. The controller 50 may include an electronic control unit (ECU) that synthetically controls constituent elements included in the image display device 10.

The controller 50 may include an analysis unit 51, an evaluation unit 52, a decision unit 53, and a display control unit 55.

The analysis unit 51 may have a function of analyzing a state of the pedestrian W detected by the detector 30, and identifying the own-vehicle notification information. The state of the pedestrian W to be analyzed by the analysis unit 51 may include the pedestrian position and the pedestrian direction of the pedestrian W, and behavior and safety of the pedestrian W to be predicted from road environment regarding the pedestrian W. Non-limiting examples of the road environment regarding the pedestrian W may include a road width of the road, the number of lanes of the road, the road markings and the road signs, the own vehicle 1 and the surrounding vehicle X around the pedestrian W, and the traffic lights.

The analysis unit 51 may analyze the state of the pedestrian W on the basis of these pieces of the information, and identify, in accordance with the state of the pedestrian W, the own-vehicle notification information to be notified to the pedestrian W. For example, let us assume that the analysis unit 51 analyzes the state of the pedestrian W as follows. The pedestrian position is located close to the driveway, and far away from the own vehicle 1. The pedestrian direction is an approaching direction with respect to the driveway. The road includes one lane on each side, and the road width is small. There is no surrounding vehicle X. There are no road markings, no road signs, nor traffic lights. In this case, the analysis unit 51 may make a prediction that the pedestrian W will cross the driveway, and make a prediction that the safety of the pedestrian W will be protected even if the pedestrian W crosses. The analysis unit 51 may identify the own-vehicle notification information in accordance with, for example, the predicted behavior of the pedestrian W. For example, as illustrated in FIG. 3, the analysis unit 51 may identify, as the own-vehicle notification information to the pedestrian W, information indicating "prompting for crossing". The information indicating "prompting for crossing" prompts the pedestrian W to cross the driveway. The analysis unit 51 may supply the evaluation unit 52 with the own-vehicle notification information identified.

Moreover, the analysis unit 51 may have a function of analyzing the surrounding-vehicle notification image GX detected by the detector 30, and identifying the surrounding-vehicle notification information indicated by the surrounding-vehicle notification image GX. In a case with presence of the surrounding vehicle X around the own vehicle 1, with the surrounding vehicle X including an image display device similar to the image display device 10, it is plausible that the surrounding vehicle X has already displayed the surrounding-vehicle notification image GX on the road surface R. It is also plausible that the surrounding-vehicle notification information indicated by the surrounding-vehicle notification image GX may be the notification information in accordance with the state of the pedestrian W, as with the own-vehicle notification information. The analysis unit 51 may perform image analysis of the surrounding-vehicle notification image GX detected by the detector 30, and identify the surrounding-vehicle notification information indicated by the surrounding-vehicle notification image GX. The analysis unit 51 may supply the surrounding-vehicle notification information identified, to the evaluation unit 52.

The evaluation unit 52 may have a function of evaluating the priority level of the notification information. The priority level may be an index that indicates whether to give priority to notifying the own-vehicle notification information to a target of notification or whether to give priority to notifying the surrounding-vehicle notification information to the target of notification. The priority level may be relative merits of the notification information evaluated with reference to whether the safety of the pedestrian W is protected more easily by the own-vehicle notification information or whether the safety of the pedestrian W is protected more easily by the surrounding-vehicle notification information. In other words, the evaluation unit 52 may evaluate the priority level with reference to the safety of the pedestrian W detected by the detector 30. The evaluation unit 52 may evaluate the priority level of each of the own-vehicle notification information and the surrounding-vehicle notification information identified by the analysis unit 51. The evaluation unit 52 may supply an evaluation result to the decision unit 53.

For example, as summarized in FIG. 3, the evaluation unit 52 may evaluate information indicating "no crossing" as a priority level A of the highest priority level. The information indicating "no crossing" notifies the pedestrian W of prohibition of crossing the driveway. The evaluation unit 52 may evaluate information indicating "permission to cross" as a priority level B of a lower priority level than "no crossing". The information indicating "permission to cross" notifies the pedestrian W of permission to cross the driveway. The evaluation unit 52 may evaluate the information indicating "prompting for crossing" as the priority level B of the lower priority level than "no crossing". The information indicating "prompting for crossing" prompts the pedestrian W to cross the driveway. The evaluation unit 52 may evaluate information indicating "greeting" as a priority level C of the lowest priority level. The information indicating "greeting" notifies a greeting to the pedestrian W.

The decision unit 53 may have a function of deciding a display mode of the own-vehicle notification image G1. The display mode of the own-vehicle notification image G1 may include at least a display form and a display region of the own-vehicle notification image G1, in addition to an image itself of the own-vehicle notification image G1. The display form of the own-vehicle notification image G1 may be, for example, a size, luminance, and a color of the own-vehicle notification image G1, and indicate whether or not to cause the own-vehicle notification image G1 to be on more highlighted display than normal. The display region of the own-vehicle notification image G1 may be a predetermined region of the road surface R where the own-vehicle notification image G1 is to be displayed. Moreover, the display mode of the own-vehicle notification image G1 may include display timing, i.e., timing at which the own-vehicle notification image G1 is to be displayed in the display region.

The decision unit 53 may decide the display mode of the own-vehicle notification image G1, on the basis of the image detected by the detector 30 or the information indicated by the image. In particular, the decision unit 53 may be able to decide the display mode of the own-vehicle notification image G1, on the basis of the surrounding-vehicle notification image GX detected by the detector 30. At this occasion, the decision unit 53 may decide the display mode of the own-vehicle notification image G1, to keep the own-vehicle notification image G1 from interfering with the surrounding-vehicle notification image GX. The interference of the own-vehicle notification image G1 with the surrounding-vehicle notification image GX means that the notification information indicated by one of the images impairs the notification information indicated by the other of the images, because of, for example, overlap or superposition of the display region of the own-vehicle notification image G1 on a display region of the surrounding-vehicle notification image GX, and coincidence of the display timing of the own-vehicle notification image G1 with display timing of the surrounding-vehicle notification image GX. However, even in the case with the overlap or the superposition of the display region of the own-vehicle notification image G1 on the display region of the surrounding-vehicle notification image GX, and the coincidence of the display timing of the own-vehicle notification image G1 with the display timing of the surrounding-vehicle notification image GX, there occurs no interference of the own-vehicle notification image G1 with the surrounding-vehicle notification image GX, when the display regions of the own-vehicle notification image G1 and the surrounding-vehicle notification image GX are substantially superposed, and the own-vehicle notification image G1 and the surrounding-vehicle notification image GX are displayed as a substantially identical image and in a substantially identical display form. The interference of the own-vehicle notification image G1 with the surrounding-vehicle notification image GX may cause possibility that the target of notification, e.g., the pedestrian W, becomes less likely to appropriately recognize the notification information important for the target of notification. Therefore, the decision unit 53 may decide the display mode of the own-vehicle notification image G1, to keep the own-vehicle notification image G1 from interfering with the surrounding-vehicle notification image GX.

In one specific but non-limiting example, the decision unit 53 may decide the display mode of the own-vehicle notification image G1 on the basis of the evaluation result of the evaluation unit 52. For example, in a case where the priority level of the own-vehicle notification information is higher than the priority level of the surrounding-vehicle notification information, the decision unit 53 may decide the display mode of the own-vehicle notification image G1, to cause the own-vehicle notification image G1 to be displayed in the predetermined region of the road surface R spaced away from the display region of the surrounding-vehicle notification image GX by a predetermined distance. Simultaneously, in the case where the priority level of the own-vehicle notification information is higher than the priority level of the surrounding-vehicle notification information, the decision unit 53 may decide the display mode of the own-vehicle notification image G1, to cause the own-vehicle notification image G1 to be on more highlighted display than the surrounding-vehicle notification image GX. It is to be noted that details of the display mode of the own-vehicle notification image G1 to be decided on the basis of the evaluation result of the evaluation unit 52 are described later with reference to FIGS. 4 and 5.

The display control unit 55 may have a function of performing a display control of the own-vehicle notification image G1 on the road surface R. The display control unit 55 may control the illuminator 20 to cause the own-vehicle notification image G1 to be displayed on the road surface R in accordance with the display mode decided by the decision unit 53.

[2. Detailed Flow of Image Display Processing]

Figure 4:
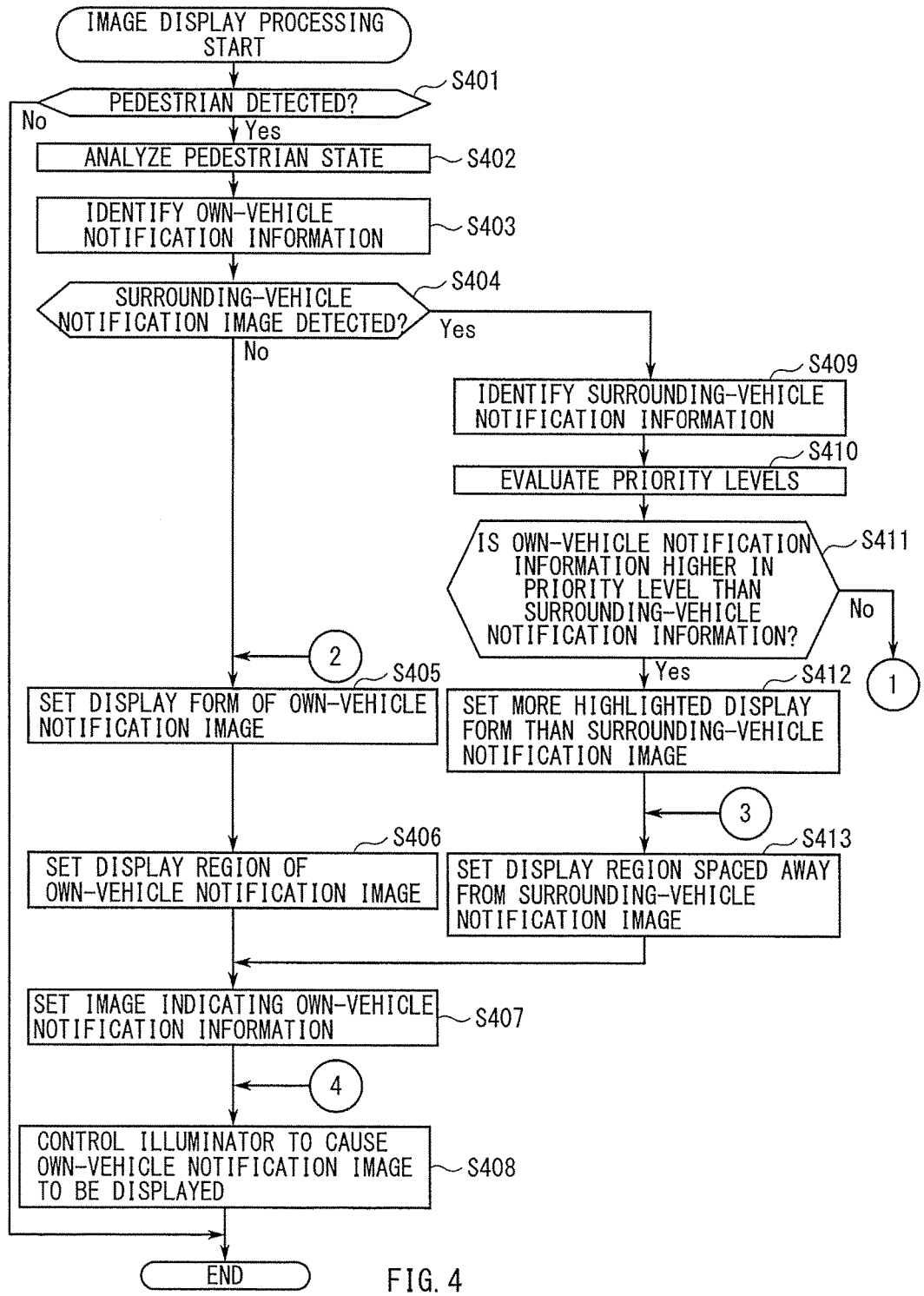
FIG. 4 is a flowchart of a detailed flow of image display processing to be performed in the image display device according to the first implementation of the technology.
Figure 5:
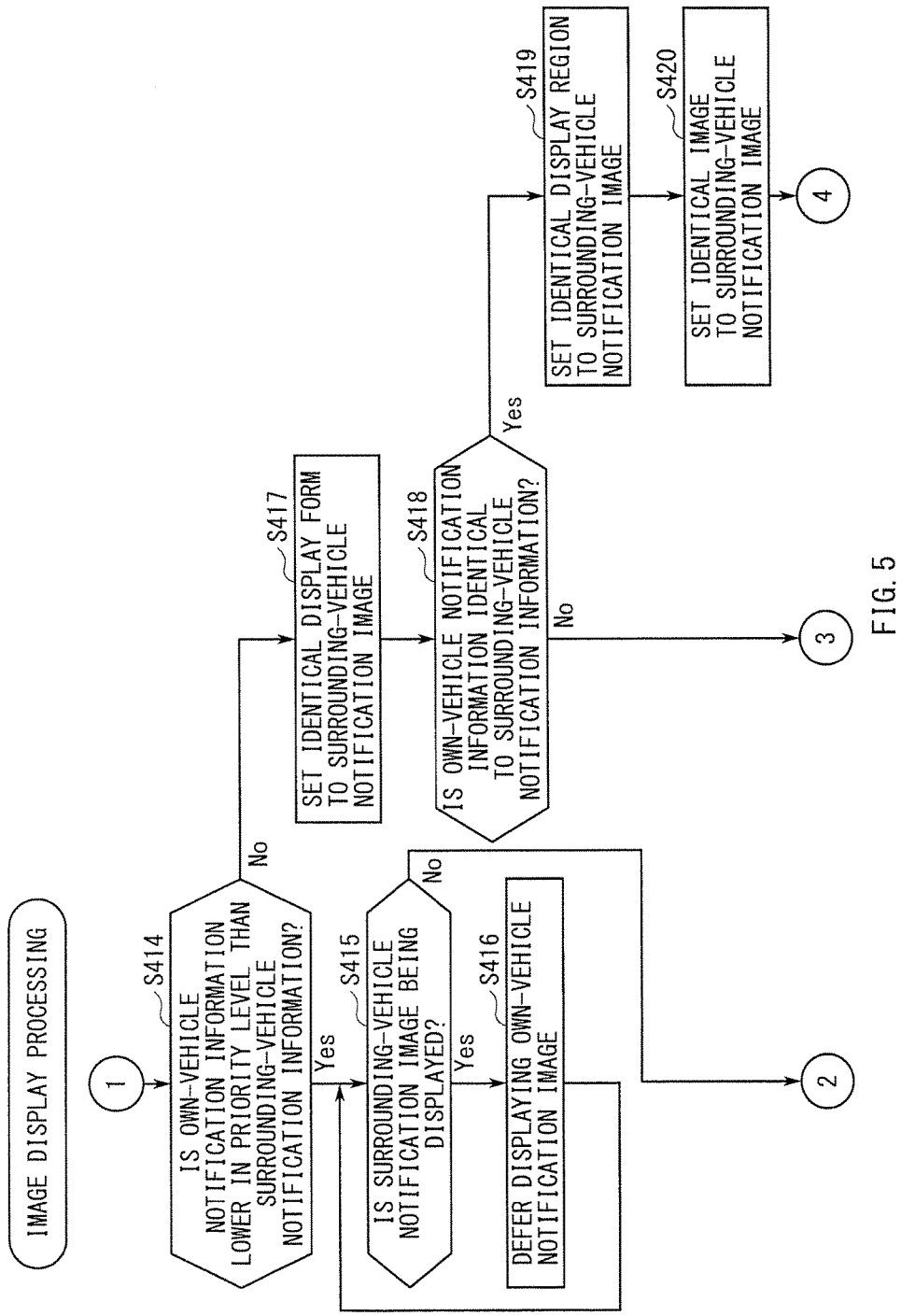
FIG. 5 is a flowchart of the detailed flow of the image display processing to be executed subsequent to the processing illustrated in FIG. 4.

FIG. 4 is a flowchart of a detailed flow of the image display processing to be performed in the image display device 10 according to the first implementation of the technology. FIG. 5 is a flowchart of the detailed flow of the image display processing to be executed subsequent to the processing illustrated in FIG. 4.

The image display processing illustrated in FIGS. 4 and 5 may be executed as timer interruption processing performed at predetermined cycles.

In step S401, the controller 50 may determine whether or not the pedestrian W has been detected by the detector 30. In one specific but non-limiting example, the controller 50 may determine whether or not an image of the pedestrian W is included in images acquired by the detector 30, to determine whether or not the pedestrian W has been detected by the detector 30. In a case where the pedestrian W has not been detected by the detector 30, the controller 50 may end the processing. In a case where the pedestrian W has been detected by the detector 30, the controller 50 may proceed to step S402.

In step S402, the controller 50 may analyze the state of the pedestrian W detected by the detector 30.

In step S403, the controller 50 may identify the own-vehicle notification information to the pedestrian W, in accordance with the analyzed state of the pedestrian W.

In step S404, the controller 50 may determine whether or not the surrounding-vehicle notification image GX has been detected by the detector 30. In one specific but non-limiting example, the controller 50 may determine whether or not the surrounding-vehicle notification image GX is included in the images acquired by the detector 30, to determine whether or not the surrounding-vehicle notification image GX has been detected by the detector 30. In a case where the surrounding-vehicle notification image GX has been detected by the detector 30, the controller 50 may proceed to step S409. In a case where the surrounding-vehicle notification image GX has not been detected by the detector 30, the controller 50 may proceed to step S405.

In step S405, the controller 50 may set the display form of the own-vehicle notification image G1. In one specific but non-limiting example, the controller 50 may set the display form of the own-vehicle notification image G1, to cause the own-vehicle notification image G1 to be displayed in a normal display form.

In step S406, the controller 50 may set the predetermined region of the road surface R located frontward of the own vehicle 1, as the display region where the own-vehicle notification image G1 is to be displayed.

In step S407, the controller 50 may set an image indicating the identified own-vehicle notification information, as the own-vehicle notification image G1.

In step S408, the controller 50 may control the illuminator 20 to cause the own-vehicle notification image G1 to be displayed on the road surface R, as the set image, in the set display form, and in the set display region. Thereafter, the controller 50 may end the processing.

In step S409, the controller 50 may analyze the surrounding-vehicle notification image GX detected by the detector 30, and identify the surrounding-vehicle notification information indicated by the surrounding-vehicle notification image GX.

In step S410, the controller 50 may evaluate the priority level of each of the own-vehicle notification information and the surrounding-vehicle notification information identified. On the basis of the evaluation result, the controller 50 may decide the display mode of the own-vehicle notification image G1, as described in the following steps.

In step S411, the controller 50 may determine whether or not the priority level of the own-vehicle notification information is higher than the priority level of the surrounding-vehicle notification information. In a case where the priority level of the own-vehicle notification information is not higher than the priority level of the surrounding-vehicle notification information, the controller 50 may proceed to step S414. In a case where the priority level of the own-vehicle notification information is higher than the priority level of the surrounding-vehicle notification information, the controller 50 may proceed to step S412.

In step S412, the controller 50 may set, as the display form of the own-vehicle notification image G1, a display form that causes the own-vehicle notification image G1 to be on the more highlighted display than the surrounding-vehicle notification image GX. For example, the controller 50 may set at least one of the size, the luminance, and the color of the own-vehicle notification image G1 at a different value from that of the surrounding-vehicle notification image GX, to cause the own-vehicle notification image G1 to be on the more highlighted display than the surrounding-vehicle notification image GX.

In step S413, the controller 50 may set the display region of the own-vehicle notification image G1. In one specific but non-limiting example, the controller 50 may set, as the display region of the own-vehicle notification image G1, the predetermined region of the road surface R spaced away from the display region of the surrounding-vehicle notification image GX by the predetermined distance. Thereafter, the controller 50 may proceed to step S407. After the controller 50 proceeding to step S407, on the road surface R, the own-vehicle notification image G1 may be on the more highlighted display than the surrounding-vehicle notification image GX. The own-vehicle notification image G1 may be spaced away from the surrounding-vehicle notification image GX by the predetermined distance, without the overlap or the superposition on the surrounding-vehicle notification image GX. Thus, the own-vehicle notification image G1 may be displayed without interfering with the surrounding-vehicle notification image GX.

In step S414, the controller 50 may determine whether or not the priority level of the own-vehicle notification information is lower than the priority level of the surrounding-vehicle notification information. In a case where the priority level of the own-vehicle notification information is not lower than the priority level of the surrounding-vehicle notification information, the controller 50 may proceed to step S417. In a case where the priority level of the own-vehicle notification information is lower than the priority level of the surrounding-vehicle notification information, the controller 50 may proceed to step S415.

In step S415, the controller 50 may determine whether or not the surrounding-vehicle notification image GX is being displayed on the road surface R. In a case where the surrounding-vehicle notification image GX is being displayed on the road surface R, the controller 50 may proceed to step S416. In a case where the surrounding-vehicle notification image GX is not being displayed on the road surface R, the controller 50 may proceed to step S405.

In step S416, the controller 50 may defer displaying the own-vehicle notification image G1 on the road surface R, and proceed to step S415. In other words, the controller 50 may defer displaying the own-vehicle notification image G1, at least while the surrounding-vehicle notification image GX is being displayed. Upon an end of display of the surrounding-vehicle notification image GX, the controller 50 may proceed to step S405 from step S415. After the controller 50 proceeding to step S405, on the road surface R, display of the own-vehicle notification image G1 may be started. As a result, solely the own-vehicle notification image G1 may be displayed on the road surface R. Thus, the own-vehicle notification image G1 may be displayed without interfering with the surrounding-vehicle notification image GX.

It is to be noted that in the case where the priority level of the own-vehicle notification information is lower than the priority level of the surrounding-vehicle notification information, the controller 50 may cause the own-vehicle notification image G1 to be non-displayed, instead of deferring displaying the own-vehicle notification image G1 until the end of the display of the surrounding-vehicle notification image GX.

In step S417, the controller 50 may set a substantially identical display form to that of the surrounding-vehicle notification image GX, as the display form of the own-vehicle notification image G1.

In step S418, the controller 50 may determine whether or not the own-vehicle notification information is substantially identical to the surrounding-vehicle notification information. If a determination of "NO" is made in step S414, the priority level of the own-vehicle notification information is equivalent to the priority level of the surrounding-vehicle notification information. In this case, the controller 50 may determine whether or not the own-vehicle notification information is substantially identical to the surrounding-vehicle notification information. On the basis of a determination result, the controller 50 may decide the display mode of the own-vehicle notification image G1.

In a case where the own-vehicle notification information is substantially identical to the surrounding-vehicle notification information, the controller 50 may proceed to step S419. In a case where the own-vehicle notification information is substantially non-identical to the surrounding-vehicle notification information, the controller 50 may proceed to step S413. After the controller 50 proceeding to step S413, on the road surface R, the own-vehicle notification image G1 may be displayed, in spaced relation to the surrounding-vehicle notification image GX by the predetermined distance, without the overlap or the superposition on the surrounding-vehicle notification image GX. The own-vehicle notification image G1 may have the substantially identical display form to that of the surrounding-vehicle notification image GX. Thus, the own-vehicle notification image G1 may be displayed without interfering with the surrounding-vehicle notification image GX.

In step S419, the controller 50 may set, as the display region of the own-vehicle notification image G1, a substantially identical region to the display region of the surrounding-vehicle notification image GX.

In step S420, the controller 50 may set, as the own-vehicle notification image G1, an image that is substantially identical to the surrounding-vehicle notification image GX. Thereafter, the controller 50 may proceed to step S408. After the controller 50 proceeding to step S408, on the road surface R, the own-vehicle notification image G1 may be displayed in the substantially identical display region to that of the surrounding-vehicle notification image GX in superimposed relation to the surrounding-vehicle notification image GX. The own-vehicle notification image G1 may be the substantially identical image to the surrounding-vehicle notification image GX, and have the substantially identical display form to that of the surrounding-vehicle notification image GX. In other words, on the road surface R, the own-vehicle notification image G1 and the surrounding-vehicle notification image GX may be on unitized display. Thus, the own-vehicle notification information may be kept from interfering with notification of the surrounding-vehicle notification information. Accordingly, the own-vehicle notification image G1 may be displayed without interfering with the surrounding-vehicle notification image GX.

It is to be noted that as illustrated in FIGS. 4 and 5, after identifying the own-vehicle notification information in step S403, the controller 50 may determine, in step S404, whether or not the surrounding-vehicle notification image GX has been detected by the detector 30. Thereafter, in a case where a determination of "YES" has been made in step S404, the controller 50 may proceed to step S407 through steps S409 to S413, and perform processing of step S408. In other words, in FIGS. 4 and 5, after identifying the own-vehicle notification information, the controller 50 may determine whether or not the surrounding-vehicle notification image GX has been detected by the detector 30, and thereafter, decide the display mode of the own-vehicle notification image G1.

However, after identifying the own-vehicle notification information, the controller 50 may decide the display mode of the own-vehicle notification image G1, and thereafter, determine whether or not the surrounding-vehicle notification image GX has been detected by the detector 30. Thereafter, in a case where the surrounding-vehicle notification image GX has been detected by the detector 30, the controller 50 may evaluate the priority levels of the own-vehicle notification information and the surrounding-vehicle notification information, and on the basis of the evaluation result, change the decided display mode of the own-vehicle notification image G1. In any way, the controller 50 may decide the display mode of the own-vehicle notification image G1, on the basis of the surrounding-vehicle notification image GX detected by the detector 30.

[3. Notification Image to be Displayed by Image Display Processing]

Figure 6A:
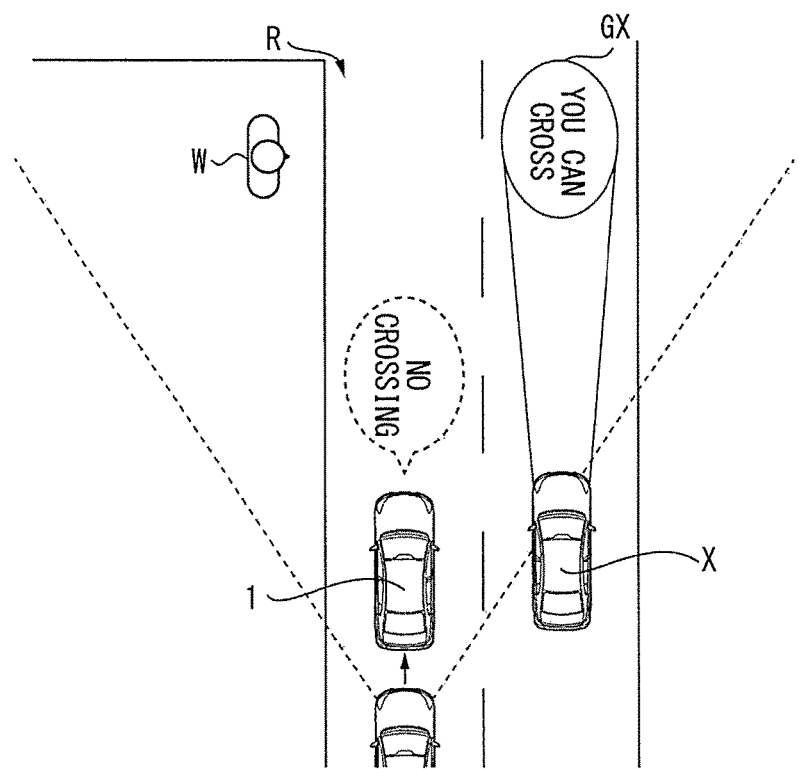
FIG. 6A illustrates a notification image to be displayed by the image display device according to the first implementation of the technology, in a case where a priority level of own-vehicle notification information is higher than a priority level of surrounding-vehicle notification information.
Figure 6B:
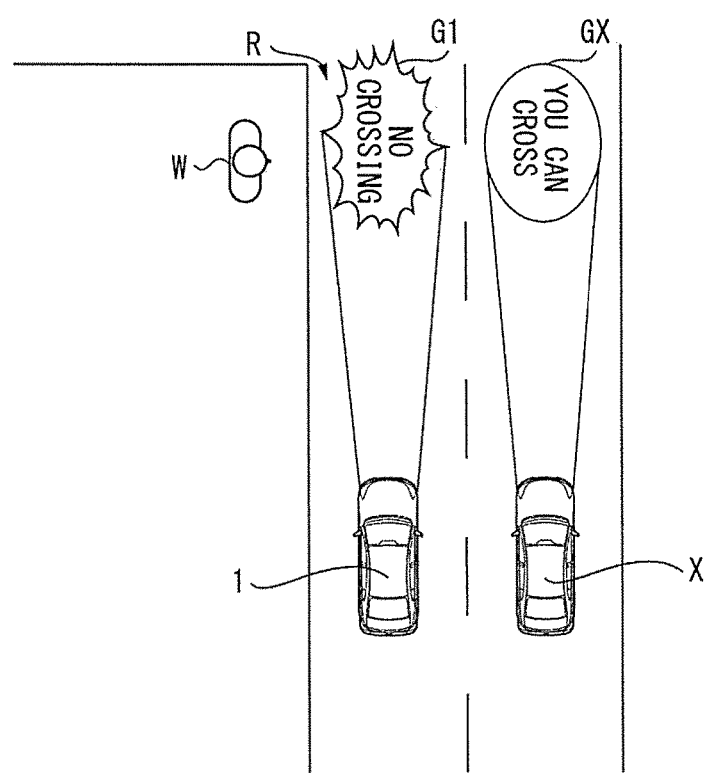
FIG. 6B illustrates the notification image to be displayed by the image display device according to the first implementation of the technology, in the case where the priority level of the own-vehicle notification information is higher than the priority level of the surrounding-vehicle notification information.

FIGS. 6A and 6B illustrate the notification image G to be displayed by the image display device 10 according to the first implementation of the technology, in the case where the priority level of the own-vehicle notification information is higher than the priority level of the surrounding-vehicle notification information. FIG. 6A illustrates a state in which the own-vehicle notification information has been identified. FIG. 6B illustrates a state in which the own-vehicle notification image G1 has been displayed.

Let us assume that as illustrated in FIG. 6A, the image display device 10 has identified the information indicating "no crossing" of the priority level A, as the own-vehicle notification information to the pedestrian W. Moreover, let us assume that the image display device 10 has identified the information indicating "permission to cross" of the priority level B, as the surrounding-vehicle notification information indicated by the surrounding-vehicle notification image GX. The priority level of the own-vehicle notification information is higher than the priority level of the surrounding-vehicle notification information.

In this case, as illustrated in FIG. 6B, the image display device 10 may display the own-vehicle notification image G1 indicating "no crossing" identified as the own-vehicle notification information. The image display device 10 may display the own-vehicle notification image G1 in the predetermined region of the road surface R that is spaced away, by the predetermined distance, from the display region of the surrounding-vehicle notification image GX indicating "permission to cross". Moreover, the image display device 10 may cause the own-vehicle notification image G1 indicating "no crossing" to be on the more highlighted display than the surrounding-vehicle notification image GX indicating "permission to cross".

Figure 7A:
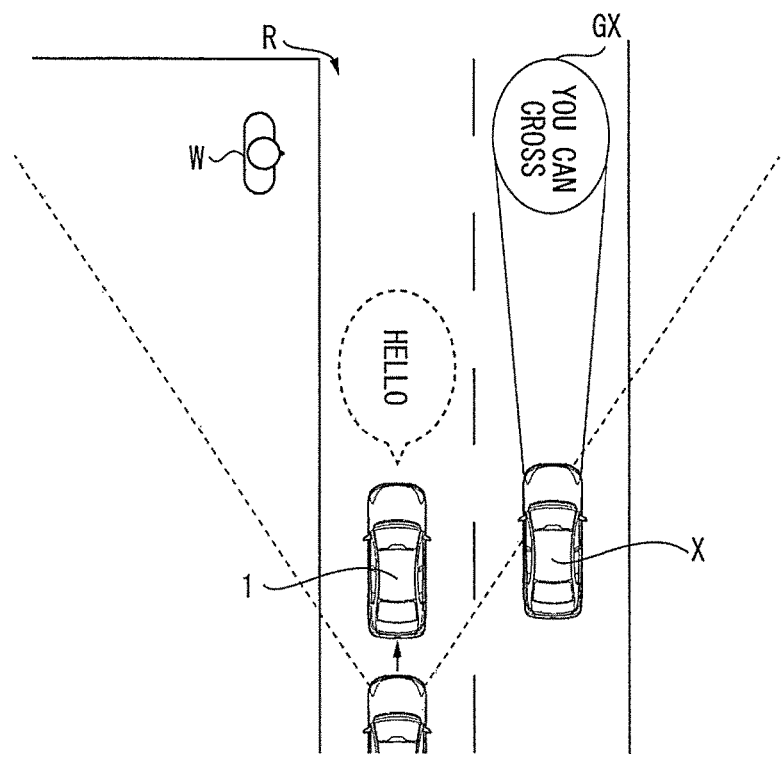
FIG. 7A illustrates the notification image to be displayed by the image display device according to the first implementation of the technology, in a case where the priority level of the own-vehicle notification information is lower than the priority level of the surrounding-vehicle notification information.
Figure 7B:
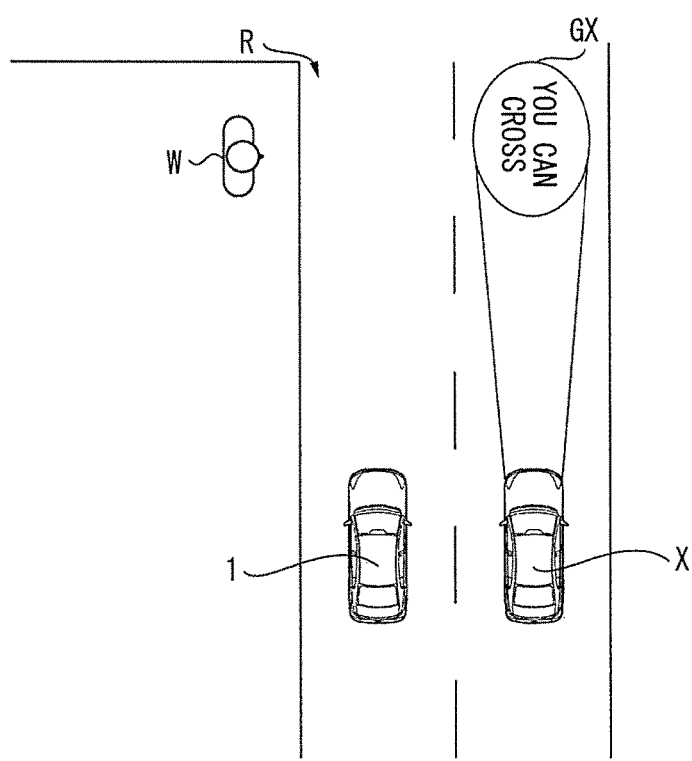
FIG. 7B illustrates the notification image to be displayed by the image display device according to the first implementation of the technology, in the case where the priority level of the own-vehicle notification information is lower than the priority level of the surrounding-vehicle notification information.

FIGS. 7A and 7B illustrate the notification image G to be displayed by the image display device 10 according to the first implementation of the technology, in the case where the priority level of the own-vehicle notification information is lower than the priority level of the surrounding-vehicle notification information. FIG. 7A illustrates a state in which the own-vehicle notification information has been identified. FIG. 7B illustrates a state in which the display of the own-vehicle notification image G1 is deferred.

Let us assume that as illustrated in FIG. 7A, the image display device 10 has identified the information indicating "greeting" of the priority level C, as the own-vehicle notification information to the pedestrian W. Moreover, let us assume that the image display device 10 has identified the information indicating "permission to cross" of the priority level B, as the surrounding-vehicle notification information indicated by the surrounding-vehicle notification image GX. The priority level of the own-vehicle notification information is lower than the surrounding-vehicle notification information.

In this case, as illustrated in FIG. 7B, the image display device 10 may defer displaying the own-vehicle notification image G1 indicating "greeting" identified as the own-vehicle notification information, while the surrounding-vehicle notification image GX indicating "permission to cross" is being displayed. Thereafter, upon the end of the display of the surrounding-vehicle notification image GX indicating "permission to cross", the image display device 10 may start displaying the own-vehicle notification image G1 indicating "greeting". On the road surface R, solely the own-vehicle notification image G1 indicating "greeting" may be displayed. It is to be noted that the image display device 10 may cause the own-vehicle notification image G1 to be non-displayed even after the end of the display of the surrounding-vehicle notification image GX.

Figure 8A:
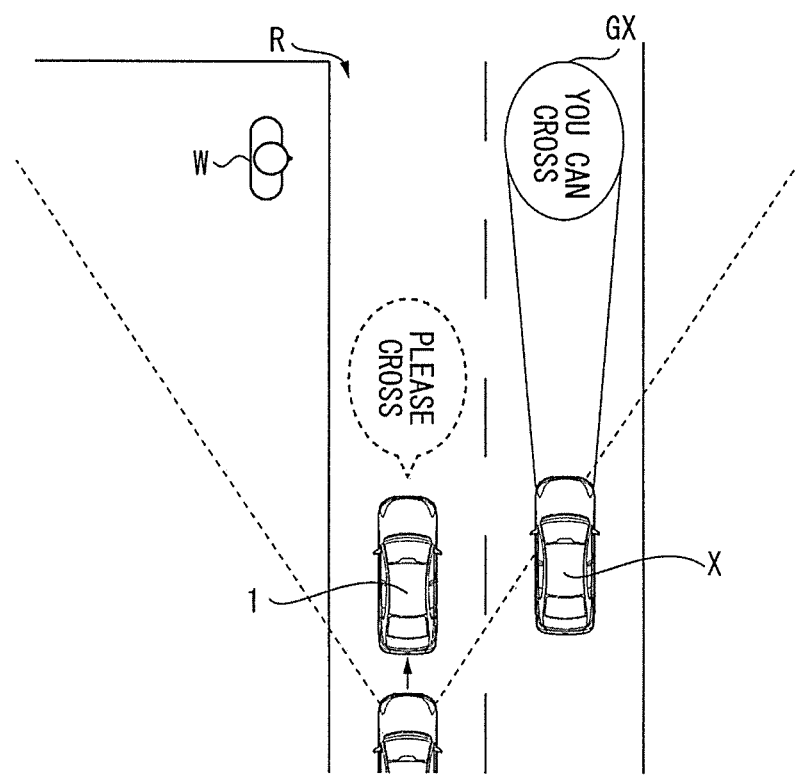
FIG. 8A illustrates the notification image to be displayed by the image display device according to the first implementation of the technology, in a case where the priority level of the own-vehicle notification information is equivalent to the priority level of the surrounding-vehicle notification information, and the own-vehicle notification information and the surrounding-vehicle notification information are substantially non-identical.
Figure 8B:
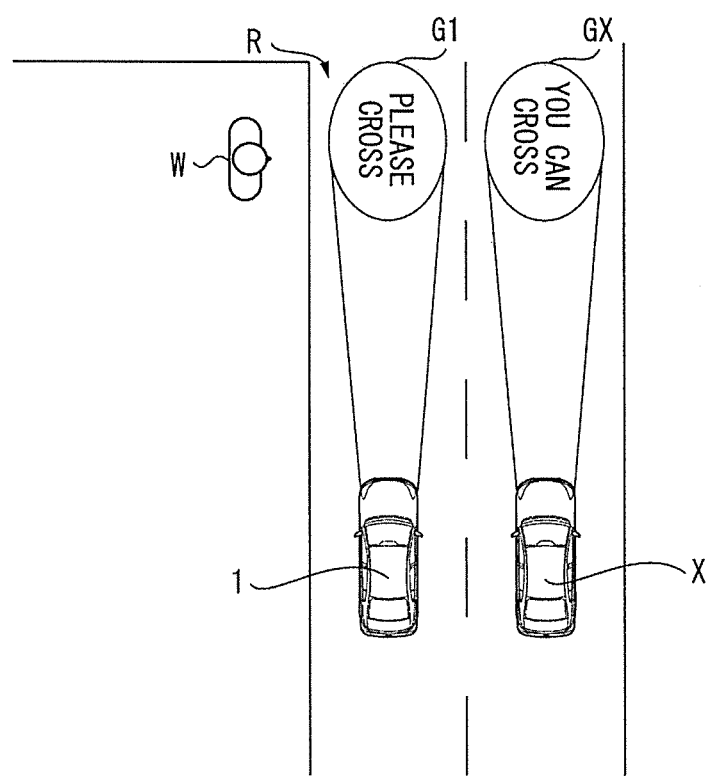
FIG. 8B illustrates the notification image to be displayed by the image display device according to the first implementation of the technology, in the case where the priority level of the own-vehicle notification information is equivalent to the priority level of the surrounding-vehicle notification information, and the own-vehicle notification information and the surrounding-vehicle notification information are substantially non-identical.

FIGS. 8A and 8B illustrate the notification image G to be displayed by the image display device 10 according to the first implementation of the technology, in the case where the priority level of the own-vehicle notification information is equivalent to the priority level of the surrounding-vehicle notification information, and the own-vehicle notification information and the surrounding-vehicle notification information are substantially non-identical. FIG. 8A illustrates a state in which the own-vehicle notification information has been identified. FIG. 8B illustrates a state in which the own-vehicle notification image G1 has been displayed.

Let us assume that as illustrated in FIG. 8A, the image display device 10 has identified the information indicating "prompting for crossing" of the priority level B, as the own-vehicle notification information to the pedestrian W. Moreover, let us assume that the image display device 10 has identified the information indicating "permission to cross" of the priority level B, as the surrounding-vehicle notification information indicated by the surrounding-vehicle notification image GX. The priority level of the own-vehicle notification information is equivalent to the priority level of the surrounding-vehicle notification information. The own-vehicle notification information is substantially non-identical to the surrounding-vehicle notification information.

In this case, as illustrated in FIG. 8B, the image display device 10 may display the own-vehicle notification image G1 indicating "prompting for crossing", in the predetermined region of the road surface R that is spaced away, by the predetermined distance, from the display region of the surrounding-vehicle notification image GX indicating "permission to cross". Moreover, the image display device 10 may display the own-vehicle notification image G1 indicating "prompting for crossing", in the substantially identical display form to that of the surrounding-vehicle notification image GX indicating "permission to cross".

Figure 9A:
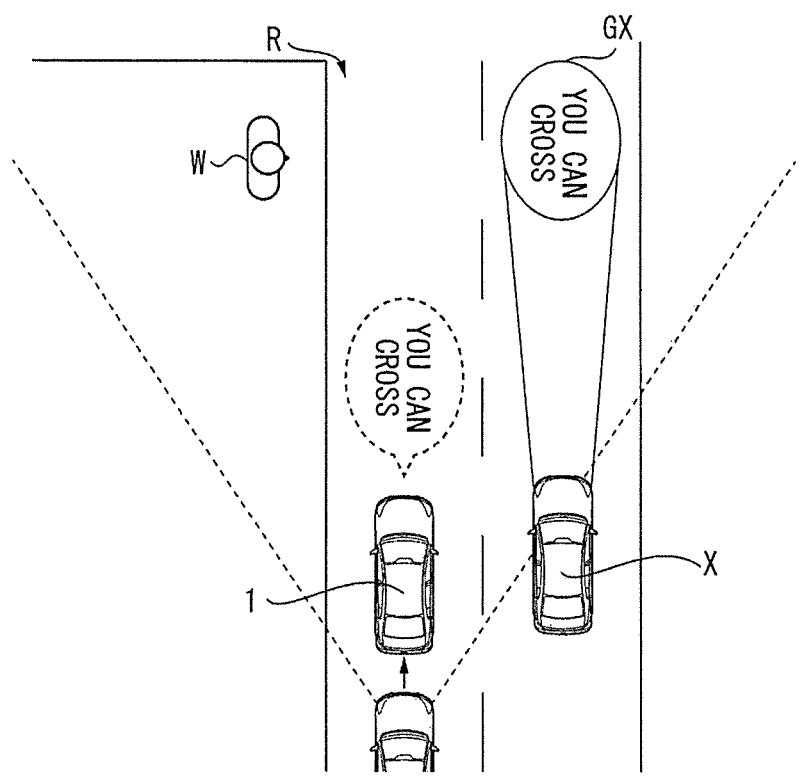
FIG. 9A illustrates the notification image to be displayed by the image display device according to the first implementation of the technology, in a case where the priority level of the own-vehicle notification information is equivalent to the priority level of the surrounding-vehicle notification information, and the own-vehicle notification information and the surrounding-vehicle notification information are substantially identical.
Figure 9B:
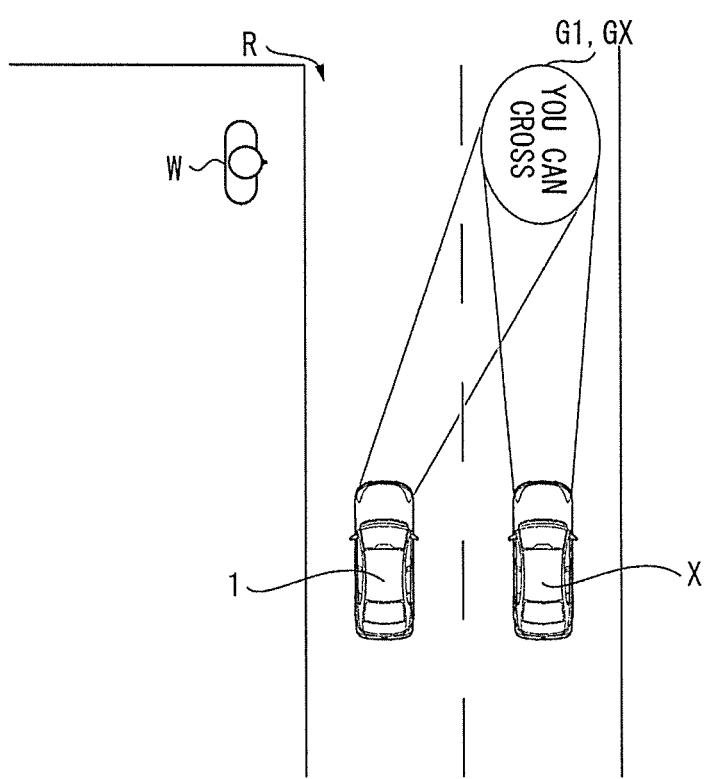
FIG. 9B illustrates the notification image to be displayed by the image display device according to the first implementation of the technology, in the case where the priority level of the own-vehicle notification information is equivalent to the priority level of the surrounding-vehicle notification information, and the own-vehicle notification information and the surrounding-vehicle notification information are substantially identical.

FIGS. 9A and 9B illustrate the notification image G to be displayed by the image display device 10 according to the first implementation of the technology, in the case where the priority level of the own-vehicle notification information is equivalent to the priority level of the surrounding-vehicle notification information, and the own-vehicle notification information and the surrounding-vehicle notification information are substantially identical. FIG. 9A illustrates a state in which the own-vehicle notification information has been identified. FIG. 9B illustrates a state in which the own-vehicle notification image G1 has been displayed in the superimposed relation to the surrounding-vehicle notification image GX.

Let us assume that as illustrated in FIG. 9A, the image display device 10 has identified the information indicating "permission to cross" of the priority level B, as the own-vehicle notification information to the pedestrian W. Moreover, let us assume that the image display device 10 has identified the information indicating "permission to cross" of the priority level B, as the surrounding-vehicle notification information indicated by the surrounding-vehicle notification image GX. The priority level of the own-vehicle notification information is equivalent to the priority level of the surrounding-vehicle notification information. The own-vehicle notification information is substantially identical to the surrounding-vehicle notification information.

In this case, as illustrated in FIG. 9B, the image display device 10 may display the own-vehicle notification image G1 that indicates "permission to cross" and is substantially identical to the surrounding-vehicle notification image GX. The image display device 10 may display the own-vehicle notification image G1 in the substantially identical display form to that of the surrounding-vehicle notification image GX. The image display device 10 may display the own-vehicle notification image G1 in the substantially identical display region to that of the surrounding-vehicle notification image GX in the superimposed relation to the surrounding-vehicle notification image GX.

[4. Workings and Effects]

As described, the image display device 10 according to the first implementation may decide the display mode of the own-vehicle notification image G1, on the basis of the surrounding-vehicle notification image GX displayed on the road surface R, or on the basis of the information indicated by the surrounding-vehicle notification image GX. Accordingly, in the image display device 10 according to the first implementation, it is possible to display the own-vehicle notification image G1, to keep the own-vehicle notification image G1 from interfering with the surrounding-vehicle notification image GX displayed on the road surface R. Hence, in the image display device 10 according to the first implementation, it is possible to notify the notification information important for the target of notification, e.g., the pedestrian W. It is possible to appropriately notify information to the target of notification.

Meanwhile, for example, in the technique as described in JP-A No. 2016-107777, it is not clear how to display an image to be displayed by an own vehicle in a case with presence of an image displayed on a road surface by a surrounding vehicle. Accordingly, the technique as described in JP-A No. 2016-107777 involves possibility of overlap or superposition of the display image of the own vehicle on the display image of the surrounding vehicle. Thus, the technique as described in JP-A No. 2016-107777 contributes to possibility that the display image may fail in appropriately notifying information, and give erroneous recognition to a target of notification. In contrast, in the image display device 10 according to this implementation, it is possible to display the own-vehicle notification image G1, to keep the own-vehicle notification image G1 from interfering with the surrounding-vehicle notification image GX displayed on the road surface R. This makes it possible for the pedestrian W to appropriately know the notification information important for the target of notification.

In particular, in a case where the notification information is information related to the safety of the target of notification, e.g., the pedestrian W, notifying the notification information to the target of notification appropriately makes it possible for the target of notification to take an action for safety. This makes traffic accidents less likely to occur. In the image display device 10 according to the first implementation, it is possible to appropriately notify information to the target of notification, leading to suppression of occurrence of the traffic accidents.

Furthermore, the image display device 10 according to the first implementation may evaluate the priority levels of the own-vehicle notification information and the surrounding-vehicle notification information, and on the basis of the evaluation result, decide the display mode of the own-vehicle notification image G1. Accordingly, in the image display device 10 according to the first implementation, it is possible to give priority to notifying the target of notification of the notification information important for the target of notification. Hence, in the image display device 10 according to the first implementation, it is possible to notify information to the target of notification more appropriately, leading to further suppression of the occurrence of the traffic accidents.

At this occasion, in the case where the priority level of the own-vehicle notification information is higher than the priority level of the surrounding-vehicle notification information, the image display device 10 according to the first implementation may decide the display mode of the own-vehicle notification image G1, to cause the own-vehicle notification image G1 to be displayed in the region spaced away from the display region of the surrounding-vehicle notification image GX by the predetermined distance. Simultaneously, the image display device 10 according to the first implementation may decide the display mode of the own-vehicle notification image G1, to cause the own-vehicle notification image G1 to be on the more highlighted display than the surrounding-vehicle notification image GX. Accordingly, in the image display device 10 according to the first implementation, it is possible to effectively notify the target of notification of the notification information having a higher priority level. Hence, in the image display device 10 according to the first implementation, it is possible to notify information to the target of notification even more appropriately, leading to the further suppression of the occurrence of the traffic accidents.

Moreover, in the case where the priority level of the own-vehicle notification information is lower than the priority level of the surrounding-vehicle notification information, the image display device 10 according to the first implementation may decide the display mode of the own-vehicle notification image G1, to defer displaying the own-vehicle notification image G1, at least while the surrounding-vehicle notification image GX is being displayed. Accordingly, in the image display device 10 according to the first implementation, it is possible to notify the target of notification in advance solely of the notification information of a higher priority level. Hence, in the image display device 10 according to the first implementation, it is possible to notify information to the target of notification even more appropriately, leading to the further suppression of the occurrence of the traffic accidents.

In addition, in the case where the priority level of the own-vehicle notification information is equivalent to the priority level of the surrounding-vehicle notification information, and the own-vehicle notification information is substantially identical to the surrounding-vehicle notification information, the image display device 10 according to the first implementation may decide the display mode of the own-vehicle notification image G1 as follows. The image display device 10 according to the first implementation may decide the display mode of the own-vehicle notification image G1, to cause the own-vehicle notification image G1 to be displayed as the substantially identical image, in the substantially identical display form, and in the substantially identical display region to those of the surrounding-vehicle notification image GX, in the superimposed relation to the surrounding-vehicle notification image GX. In other words, in the image display device 10 according to the first implementation, it is possible to cause the own-vehicle notification image G1 to be on the unitized display with the surrounding-vehicle notification image GX. Accordingly, in the image display device 10 according to the first implementation, it is possible to restrain the substantially identical notification information from being displayed in a plurality of display modes, and from giving the erroneous recognition to the target of notification. Hence, in the image display device 10 according to the first implementation, it is possible to notify information to the target of notification even more appropriately, leading to the further suppression of the occurrence of the traffic accidents.

[5. Other Implementations]

Figure 10:
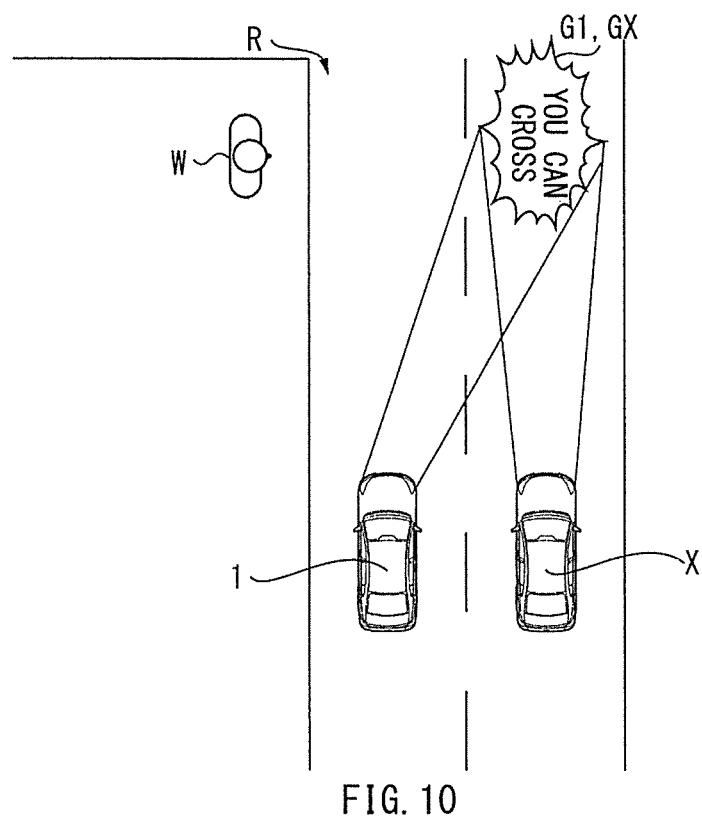
FIG. 10 illustrates a notification image to be displayed by an image display device according to a second implementation of the technology.

FIG. 10 illustrates a notification image G to be displayed by an image display device 10 according to a second implementation of the technology.

In the case where the priority level of the own-vehicle notification information is equivalent to the priority level of the surrounding-vehicle notification information, and the own-vehicle notification information and the surrounding-vehicle notification information are substantially identical, the image display device 10 according to the second implementation may decide the display mode of the own-vehicle notification image G1 as follows. The image display device 10 according to the second implementation may display an image that highlights the surrounding-vehicle notification image GX, as the own-vehicle notification image G1, instead of displaying the substantially identical image to the surrounding-vehicle notification image GX, as the own-vehicle notification image G1.

Providing that a plurality of vehicles, i.e., the own vehicle 1 and the surrounding vehicle X, identify the substantially identical notification information to the target of notification, e.g., the pedestrian, W, it is plausible that analysis of the state of the target of notification is highly reliable. The surrounding-vehicle notification information indicated by the surrounding-vehicle notification image GX is, therefore, considered to be appropriate information for the target of notification. Accordingly, in the forgoing case, the image display device 10 according to the second implementation may display the image that highlights the surrounding-vehicle notification image GX, as the own-vehicle notification image G1. Hence, in the image display device 10 according to the second implementation, it is possible to effectively notify the target of notification of the more appropriate notification information.

Figure 11:
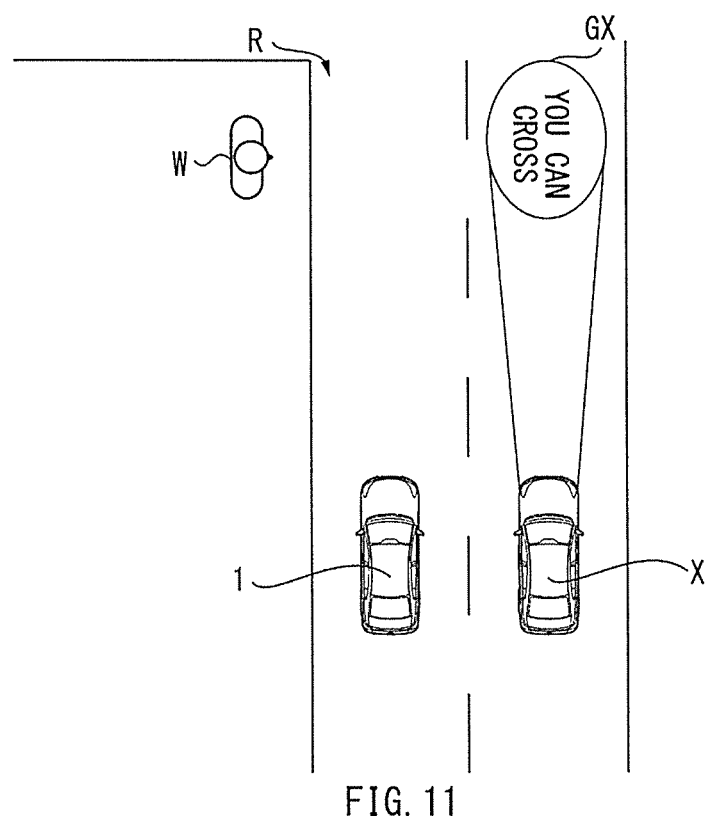
FIG. 11 illustrates a notification image to be displayed by an image display device according to a third implementation of the technology.

FIG. 11 illustrates a notification image G to be displayed by an image display device 10 according to a third implementation of the technology.

In the case where the priority level of the own-vehicle notification information is equivalent to the priority level of the surrounding-vehicle notification information, and the own-vehicle notification information and the surrounding-vehicle notification information are substantially identical, the image display device 10 according to the third implementation may decide the display mode of the own-vehicle notification image G1 as follows. The image display device 10 according to the third implementation may cause the own-vehicle notification image G1 to be non-displayed, as illustrated in FIG. 11, instead of displaying the substantially identical image to the surrounding-vehicle notification image GX, as the own-vehicle notification image G1. Hence, in the image display device 10 according to the third implementation, it is possible to restrain the own-vehicle notification image G1 from interfering with the surrounding-vehicle notification image GX, with a more simplified configuration.

FIG. 12 summarizes priority levels of notification information to be evaluated in an image display device 10 according to a fourth implementation of the technology.

In the image display device 10 according to the fourth implementation, the target of notification may be a third-party vehicle other than the own vehicle 1 and the surrounding vehicle X, instead of the pedestrian W. The third-party vehicle may be a following vehicle or an oncoming vehicle of the own vehicle 1. The image display device 10 according to the fourth implementation may evaluate the notification information to the third-party vehicle with reference to safety of the third-party vehicle. The image display device 10 according to the fourth implementation may decide the display mode of the own-vehicle notification image G1 on the basis of an evaluation result.

For example, as illustrated in FIG. 12, the image display device 10 according to the fourth implementation may evaluate information indicating "emergency stop" as the priority level A of the highest priority level. The information indicating "emergency stop" notifies that the own vehicle 1 is going to make an emergency stop. The image display device 10 according to the fourth implementation may evaluate information indicating "warning: accident" as the priority level B of a lower priority level than "emergency stop". The information indicating "warning: accident" notifies a request for careful driving because of occurrence of an accident. The image display device 10 according to the fourth implementation may evaluate information indicating "warning: traffic jam" as the priority level B of the lower priority level than "emergency stop". The information indicating "warning: traffic jam" notifies a request for careful driving because of occurrence of a traffic jam. The image display device 10 according to the fourth implementation may evaluate information indicating "greeting" as the priority level C of the lowest priority level. The information indicating "greeting" notifies a greeting to the third-party vehicle.

In the image display device 10 according to the fourth implementation, it is possible to display the own-vehicle notification image G1, to keep the own-vehicle notification image G1 from interfering with the surrounding-vehicle notification image GX. This makes it possible to appropriately notify the notification information important for the target of notification even in the case where the target of notification is a vehicle. Hence, in the image display device 10 according to the fourth implementation, it is possible to appropriately notify information to the target of notification, leading to the suppression of the occurrence of the traffic accidents.

[6. Et Cetera]

In the image display device 10 according to the forgoing implementations, the detector 30 may detect the surrounding-vehicle notification image GX displayed on the road surface R by the surrounding vehicle X, as the image displayed on the road surface R around the own vehicle 1 or the information indicated by the image. However, the image display device 10 is not limited to as described above. In the image display device 10, the detector 30 may detect the notification image G displayed on the road surface R by image display equipment provided on the road on which the own vehicle 1 travels, or information indicated by the notification image G, as the image displayed on the road surface R around the own vehicle 1 or the information indicated by the image. The image display device 10 may allow the decision unit 53 to decide the display mode of the own-vehicle notification image G1, on the basis of the notification image G of the image display equipment detected by the detector 30 or the information indicated by the notification image G. At this occasion, the image display device 10 may allow the evaluation unit 52 to evaluate the priority level of the notification information to be notified by the notification image G of the image display equipment and the priority level of the own-vehicle notification information. The image display device 10 may allow the decision unit 53 to decide the display mode of the own-vehicle notification image G1 on the basis of the evaluation result of the evaluation unit 52.

In one implementation of the technology, the image display device 10 may serve as an "image display device". In one implementation of the technology, the own vehicle 1 may serve as a "first vehicle". In one implementation of the technology, the surrounding vehicle X may serve as a "second vehicle". In one implementation of the technology, the own-vehicle notification image G1 may serve as a "first notification image". In one implementation of the technology, the surrounding-vehicle notification image GX may serve as a "second notification image". In one implementation of the technology, the road surface R may serve as a "road surface". In one implementation of the technology, the illuminator 20 may serve as an "illuminator". In one implementation of the technology, the detector 30 may serve as a "detector". In one implementation of the technology, the evaluation unit 52 may serve as an "evaluation unit". In one implementation of the technology, the decision unit 53 may serve as a "decision unit". In one implementation of the technology, the display control unit 55 may serve as a "display control unit". In one implementation of the technology, the evaluation unit 52, the decision unit 53, and the display control unit 55 may serve as "circuitry".

The evaluation unit 52, the decision unit 53, and the display control unit 55 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the evaluation unit 52, the decision unit 53, and the display control unit 55. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the evaluation unit 52, the decision unit 53, and the display control unit 55 illustrated in FIG. 2.

It should be appreciated that the forgoing implementations including modification examples may be applied to one another by persons skilled in the art.

The foregoing description is intended to be merely illustrative rather than limiting. It should therefore be appreciated that variations may be made in the implementations of the disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items.

The invention claimed is:

1. An image display device, comprising:
    a first detector configured to detect a target around a first vehicle;
    an illuminator configured to send out visible light on a road surface around the first vehicle as an own vehicle, to display a first notification image that notifies first information to the target;
    a second detector configured to detect, on the road surface, a second notification image displayed by a second vehicle, the second notification image notifying second information to the target;
    a decision unit decides a display mode of the first notification image based on the first information of the first notification image and the second information of the second notification image; and
    a display control unit configured to control the illuminator in accordance with the display mode decided by the decision unit, wherein when the first information of the first notification image is identical to the second information of the second notification image, the decision unit decides the display mode of the first notification image to be a first display mode, and the display control unit controls the illuminator to display the first notification image according to the first display mode so that the first notification image overlaps the second notification image on the road surface.

2. The image display device according to claim 1, wherein the first information of the first notification image is associated with a first priority level based on safety of the target, the second information of the second notification image is associated with a second priority level based on the safety of the target, the decision unit decides the display mode of the first notification image to be the first display mode based further on the first priority level and the second priority level, and the display control unit controls the illuminator to display the first notification image so that the first notification image overlaps the second notification image on the road surface when 1) the first priority level is equal to the second priority level and 2) the content of the first notification image is identical to the content of the second notification image.

3. The image display device according to claim 2, wherein when the first priority level associated with the first information of the first notification image is higher than the second priority level associated with the second information of the second notification image, the decision unit decides the display mode of the first notification image to be a second display mode, and the display control unit controls the illuminator to display the first notification image according to the second display mode so that the first notification image is 1) displayed in a first display region of the road surface and 2) more pronounced than the second notification image, the first display region is spaced apart from a second display region on the road surface by a distance, and the second notification image is displayed in the second display region.

4. The image display device according to claim 2, wherein when the first priority level associated with the first information of the first notification image is lower than the second priority level associated with the second information of the second notification image, the decision unit decides the display mode of the first notification image to be a third display mode in which displaying of the first notification image is deferred, at least while the second notification image is being displayed.

5. The image display device according to claim 2, wherein when 1) the first priority level associated with the first information of the first notification image is equal to the second priority level associated with the second information of the second notification image and 2) the first information of the first notification information is substantially non-identical to the second information of the second notification information, the decision unit decides the display mode of the first notification image to be a fourth display mode, and the display control unit controls the illuminator to display, according to the fourth display mode, the first notification image in a first display region on the road surface spaced apart, by a distance, from a second display region where the second notification image is displayed.

6. The image display device according to claim 2, wherein when 1) the first priority level associated with the first information of the first notification image is equal to the second priority level associated with the second information of the second notification image and 2) the first information of the first notification image is identical to the second information of the second notification information, the decision unit decides the display mode of the first notification image to be a fifth display mode, and the illuminator displays, as the first notification image according to the fifth display mode, an image that is substantially identical to the second notification image and overlaps the first notification image over the second notification image.

7. The image display device according to claim 2, wherein when 1) the first priority level associated with the first information of the first notification image is equal to the second priority level associated with the second information of the second notification image and 2) the first information of the first notification image is identical to the second information of the second notification information, the decision unit decides the display mode of the first notification image to be a sixth display mode, and the illuminator displays, as the first notification image according to the sixth display mode, an image that highlights the second notification image.

8. The image display device according to claim 2, wherein when 1) the first priority level associated with the first information of the first notification image is equal to the second priority level associated with the second information of the second notification image and 2) the first information of the first notification image is identical to the second information of the second notification information, the decision unit decides the display mode, to cause the first notification image to be non-displayed.

9. The image display device according to claim 1, wherein the illuminator includes headlights of the first vehicle.

10. The image display device according to claim 2, wherein the illuminator includes headlights of the first vehicle.

11. The image display device according to claim 3, wherein the illuminator includes headlights of the first vehicle.

12. The image display device according to claim 4, wherein the illuminator includes headlights of the first vehicle.

13. The image display device according to claim 5, wherein the illuminator includes headlights of the first vehicle.

14. The image display device according to claim 6, wherein the illuminator includes headlights of the first vehicle.

15. The image display device according to claim 7, wherein the illuminator includes headlights of the first vehicle.

16. An image display device, comprising:

a first detector configured to detect a target around a first vehicle;

an illuminator configured to send out visible light on a road surface around the first vehicle as an own vehicle, to display a first notification image that notifies first information to the target;

a second detector configured to detect, on the road surface, a second notification image displayed by a second vehicle, the second notification image notifying second information to the target; and circuitry configured to control the illuminator to display the first notification image so that the first notification image overlaps the second notification image on the road surface when 1) a priority level of the first information of the first notification image is equal to a priority level of the second information of the second notification image and 2) the first information of the first notification image is identical to the second information of the second notification image.

* * * * *